UNITED STATES PATENT OFFICE.

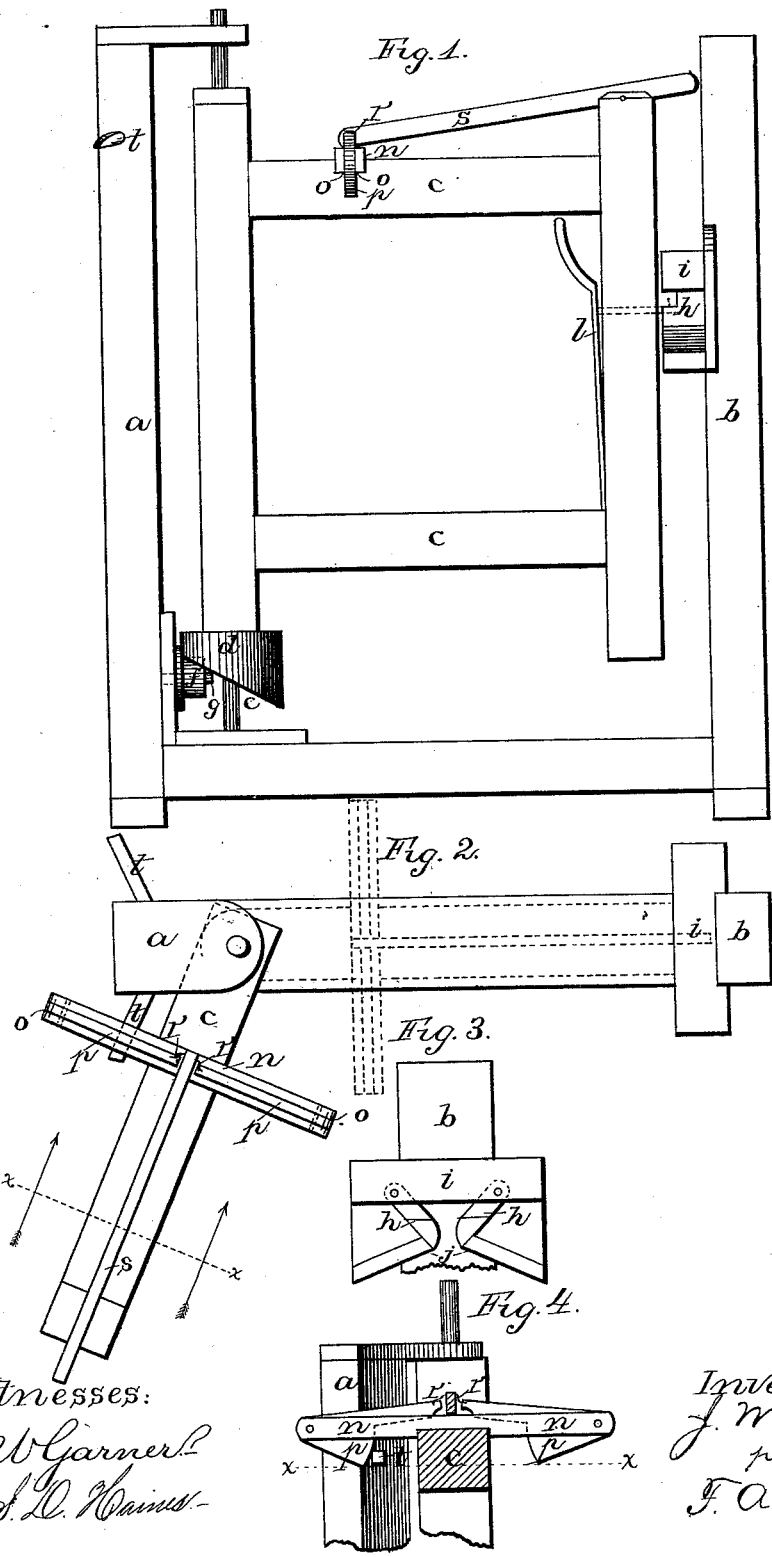

JACOB MALONE, OF CHARITON, IOWA.

IMPROVEMENT IN GATES.

Specification forming part of Letters Patent No. 218,390, dated August 12, 1879; application filed May 8, 1879.

*To all whom it may concern:*

Be it known that I, JACOB MALONE, of Chariton, in the county of Lucas and State of Iowa, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in gates; and it consists in the arrangement and combination of parts that will be more fully described hereinafter, whereby a cheap, simple, and effective gate is produced.

The accompanying drawings represent my invention.

$a$ $b$ represent the two gate-posts, and $c$ the gate. The bearing $d$ at the lower corner of the gate consists of the two inclined planes $e$, which meet at their upper ends in the shape of an inverted V. Upon a rod or pivot, $g$, projecting out from the inside of the post $a$, is placed a friction-roller, $f$, upon the top of which is placed bearing $d$.

When the gate is closed, this roller rests in the top of the two inclines; but as soon as the gate is opened in either direction, one of the inclines is made to move upon the roller, raising the gate upward. As soon as the gate is released, the incline runs down upon the roller, and causes the gate to instantly close.

The latch for the gate consists of the two pieces $h$, which are pivoted at one of their upper corners in the frame $i$, and hang down in an inclined position, as shown. The lower ends of these two pieces have their inner corners cut away, as shown, and are held from moving outward by a recess, $j$, in the frame.

When the gate swings shut from either side, the latch $l$ moves one of the catches up high enough to pass under it; but the latch cannot push either one aside in order to open, as their ends are held in the recess $j$.

Secured to the top of the gate, at right angles thereto, is the bar $n$, which has a hole, $o$, made through it on both sides of the gate. Pivoted to the under side of each end is a bent latch-rod, $p$, the inner ends of which project up through the holes $o$, and are connected by a wire, $r$, with the inner end of the lever $s$, which is pivoted upon the top of the gate.

When the gate is opened in either direction, the bent latch-rods $p$ catch over the top of the rod or projection $t$, extending out from the side of the post $a$, and hold the gate open. By bearing down upon the outer end of the lever $s$ the latch $p$ will be raised upward, and the gate will at once swing shut.

Having thus described my invention, I claim—

The combination of the post $a$, having the projection $t$, gate $c$, bar $n$, latches $p$, and lever $s$, substantially as described.

In testimony that I claim the foregoing I have hereunto set my hand this 17th day of March, 1879.

J. MALONE.

Witnesses:
G. W. ALEXANDER,
W. COLES.